S. E. HARSH.
AUTOMOBILE.
APPLICATION FILED JUNE 26, 1918.
1,318,869.
Patented Oct. 14, 1919.
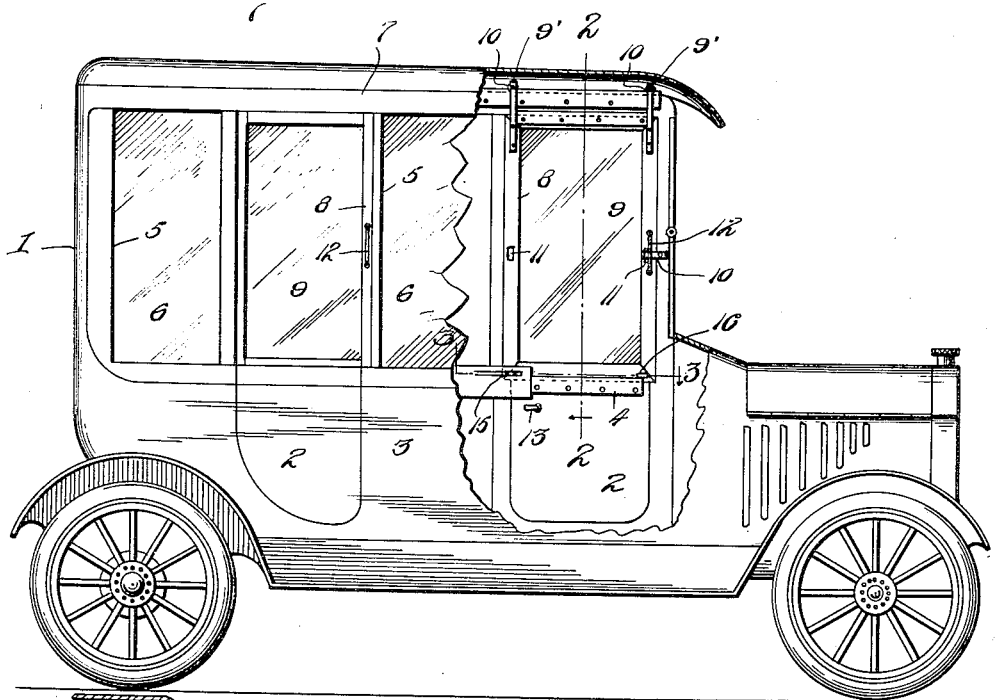
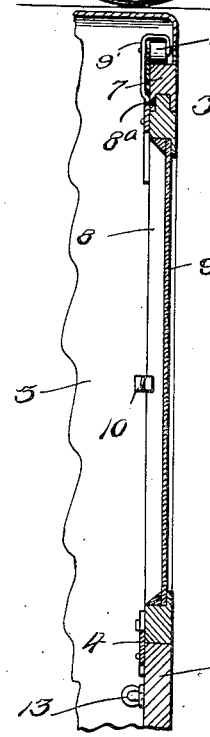
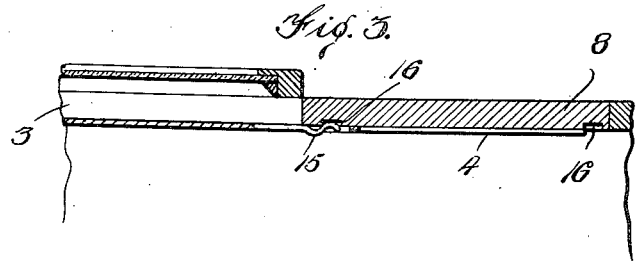
Inventor
Samuel E. Harsh,
Attorney.

UNITED STATES PATENT OFFICE.

SAMUEL E. HARSH, OF WABASH, INDIANA.

AUTOMOBILE.

1,318,869.   Specification of Letters Patent.   Patented Oct. 14, 1919.

Application filed June 26, 1918. Serial No. 241,977.

*To all whom it may concern:*

Be it known that I, SAMUEL E. HARSH, a citizen of the United States, residing at Wabash, in the county of Wabash and State of Indiana, have invented certain new and useful Improvements in Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements generally in automobiles, more especially in tops for the bodies thereof, and which may be equally adapted for tops now in general use, or may be made up wholly separate and distinct from, and independent of any other automobile top either associated with, or in use upon any automobile body.

The invention has for its object to provide for promoting the comfort of the occupants of the automobile better than otherwise afforded, particularly in stormy or winter weather conditions.

A further object of the invention is to provide for the ready adaptation of the usual automobile top for guarding against exposure to inclement weather conditions while riding in the machine.

A further object is to provide for carrying out the aforesaid ends in a simple, inexpensive and effective manner, and with facility.

With these and other objects in view, the invention consists of certain instrumentalities and features of construction substantially as will be fully described, and afterward specifically pointed out in the appended claim.

Referring to the accompanying drawings:

Figure 1, is a sectional elevation of an automobile illustrating this invention.

Fig. 2, is a vertical section taken through Fig. 1, on the line 2—2, and

Fig. 3, is a horizontal section taken through Fig. 1, on the line 3—3.

In putting my invention into practice, I have shown it as applied to an automobile of the touring type, generally indicated as 1, while it is equally applicable to an automobile of the roadster type. The two doors 2, 2, one provided for the front section of the body 3, and the other for the rear section, may be of the type shown or otherwise, said body and doors having suitably applied thereto along the upper inner edges thereof, alining metal strips 4, functions of which will presently appear.

Opposite duplicate offset stationary sashes 5, suitably glazed or fitted with glass or transparent panes 6, are provided in the sides of the top or frame 7 of the device, arranged in planes above, but in parallel lines with the doors 2, 2, thus serving as windows, as shown.

Additional sashes 8, also suitably glazed or fitted with glass or transparent panes 9, but in this case adapted to form complemental door sections or members, as will subsequently more fully appear, are slidably hung in position in the frame 7, parallel with the aforesaid sashes 5, and accordingly adapted to be slid so as to provide for admission of fresh air or ventilation, or provide for completely closing up the top of the car as would be required for protection or comfort during cold or stormy weather conditions. The slidable complemental door-forming glazed members 8 have their upper edges positioned in guide grooves $8^a$ in the underside of the framing, and are hung or slidably positioned by means of hangers or brackets 9', suitably strapped thereto and overhanging the upper edges of said door members 8, the overhanging portions of said hangers being provided with rollers 10 adapted to travel upon the upper edge of the top or frame 7 as the door member is moved to open and close the same.

It will be observed that the previously mentioned metal strips 4 applied to and projecting above the upper inner edges of the doors 2, coöperate with the lower edges of the complemental door members 8, 9 to secure the doors proper against casually swinging open, as said metal strips being applied to the inner sides of the doors proper 2, and accordingly engaging the inner sides of the slidable complemental door members, serve as stops to prevent the accidental outward movement of the doors. The complemental door members are themselves suitably held against being incidentally or casually jarred open by their engagement with spring catches $10^a$ secured to the framing, said catches being adapted to snap into notches 11 in the stiles or vertical members of said complemental door sections. Suitable hand-holds 12 are provided on the latter for conveniently manipulating the same, while the doors proper are provided with the usual handles 13 for opening and closing the same.

Also suitably secured to the parting strip of the top 7, is a metal strip or member having preferably struck-up therewith snap-spring latches 15 adapted to engage notches or recesses 16 in the complemental door-members for retention against rattling, and to automatically engage and hold the complemental door members in open or closed position.

From the foregoing it will be observed that I have provided a closed body applicable to the type of automobiles now in use, either associated with the bodies thereof, or which may be produced entirely separate and distinct as an article of trade, and placed on the market for sale as a separate entirety to be applied by the purchaser to the usual open type body.

What I claim as new and desire to secure by Letters Patent of the United States, is:

A closed body for automobiles, including, with the usual body and top thereof, an outward swinging body door and a door member complemental to and detached from and slidable upon the top edge of said body door, said body and body door being provided at their upper inner edge with metal plate members extending above said edges for contact with the inner lower edge of said slidable door member, said upper edge metal plate of the body being provided with means for latching said slidable door member in place as it is slid to open and closed position, and an offset fixed glazed sash member forming with said metal plate of the body the guideway for the lower edge of said slidable door member.

In testimony whereof I affix my signature in presence of two witnesses.

SAMUEL E. HARSH.

Witnesses:
  LOY F. WILSON,
  WM. J. ALBER.